US006545584B2

(12) United States Patent
Turner

(10) Patent No.: US 6,545,584 B2
(45) Date of Patent: Apr. 8, 2003

(54) CIRCUIT BREAKER WITH INERTIA DEVICE TO PREVENT SHOCKOUT

(75) Inventor: David Curtis Turner, Imperial, PA (US)

(73) Assignee: Eaton Corporation, Cleveland, OH (US)

( * ) Notice: Subject to any disclaimer, the term of this patent is extended or adjusted under 35 U.S.C. 154(b) by 70 days.

(21) Appl. No.: 09/761,883

(22) Filed: Jan. 17, 2001

(65) Prior Publication Data

US 2002/0092747 A1 Jul. 18, 2002

(51) Int. Cl.[7] ........................ H01H 71/16; H01H 71/54; H01H 73/52; H02H 5/04

(52) U.S. Cl. ............................ 337/38; 337/59; 337/70; 337/3; 337/13; 335/23; 335/45; 335/176; 335/202; 361/105; 361/32

(58) Field of Search ............................ 337/2, 3, 12, 13, 337/14, 35–38, 45–50, 57–60, 70, 333, 360; 335/8–10, 18, 21–23, 35–45, 172–176, 202; 361/31, 32, 103, 105

(56) References Cited

U.S. PATENT DOCUMENTS

| | | | | |
|---|---|---|---|---|
| 3,622,923 A | * | 11/1971 | Shaffer | 335/17 |
| 4,178,618 A | * | 12/1979 | Khalid | 338/61 |
| 4,513,270 A | * | 4/1985 | Belbel et al. | 335/16 |
| 4,691,182 A | | 9/1987 | Mrenna et al. | |
| 4,698,470 A | * | 10/1987 | Milianowicz | 188/267 |
| 4,922,220 A | | 5/1990 | Livesey et al. | |
| 5,192,841 A | * | 3/1993 | Milianowicz et al. | 200/288 |
| 5,971,374 A | * | 10/1999 | Freeman | 188/129 |

FOREIGN PATENT DOCUMENTS

| | | | | |
|---|---|---|---|---|
| JP | 9-147724 A | * | 6/1997 | H01H/73/06 |

* cited by examiner

*Primary Examiner*—Anatoly Vortman
(74) *Attorney, Agent, or Firm*—Martin J. Moran

(57) ABSTRACT

A pair of spring mounted masses have sufficient inertia to remain stationary in response to a shock force applied to the housing of a trip assembly in a circuit breaker to block movement of the trip bar and thereby prevent a nuisance trip.

6 Claims, 2 Drawing Sheets

CIRCUIT BREAKER WITH INERTIA DEVICE TO PREVENT SHOCKOUT

BACKGROUND OF THE INVENTION

1. Field of the Invention

This invention relates to circuit breakers, and particularly to a circuit breaker with an inertia device which prevents tripping of the circuit breaker by shock loading.

2. Background Information

Multipole circuit breakers commonly have a trip unit that monitors each pole for currents exceeding certain current/time characteristics. The response of the trip unit to an overcurrent in any pole is coupled to a single spring powered operating mechanism through a trip bar mounted for rotation about its longitudinal axis. A latch arm on the trip bar unlatches the spring powered operating mechanism when rotated by the trip unit. The latch is designed such that a relatively light force applied to the trip bar is adequate to release the relatively strong force stored in the spring powered operating mechanism. Such an assembly can be susceptible to "shockout" or unintentional tripping of the circuit breaker in response to mechanical shock. The resultant nuisance trips are unacceptable in many applications.

There is a need therefore for an improved circuit breaker that is not unduly susceptible to shock loads.

SUMMARY OF THE INVENTION

This need and others are satisfied by the invention which is directed to a circuit breaker incorporating one or more inertia devices that restrict movement of trip bar in response to shock loading but do not interfere with normal operation of the trip bar in unlatching the operating mechanism. More specifically, the circuit breaker includes a casing, separable contacts, and an operating mechanism incorporating a latch and that opens the separable contacts when the latch is unlatched. The circuit breaker further includes a trip assembly comprising a trip bar unlatching the latch when moved to a trip position and a trip device moving the trip bar to the trip position in response to selected conditions of current flowing through the separable contacts. An inertia device prevents movement of the trip bar to the trip position in response to a mechanical shock. The trip bar comprises an elongated member mounted for rotation about a longitudinal axis. The inertia device comprises at least one mass and a compliant mount mounting the mass adjacent the trip bar to engage the trip bar in response to the mechanical shock and prevent unlatching of the latch. The compliant mount is a spring mount which comprises a mounting support, a mounting rod carrying the at least one mass and slideable relative to the mounting support and a spring coupling the mass to the mounting support. The spring can be a helical compression spring mounted coaxially on the mounting rod. The trip assembly can include a trip housing in which the elongated member is rotatably mounted and to which the mounting support is mounted.

A pair of the masses can be provided, each mounted by a compliant mount on opposite sides of the trip bar to counteract shock loading in opposite directions.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
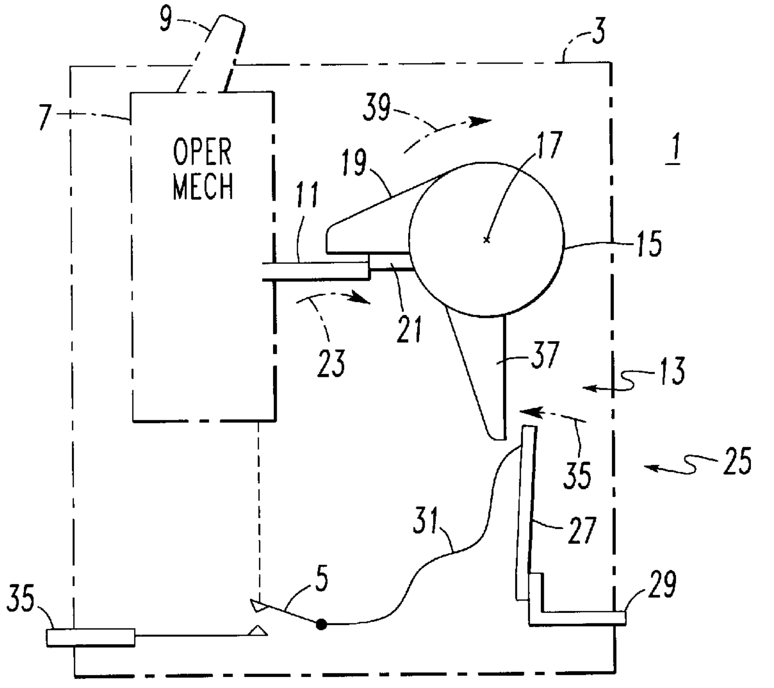
FIG. 1 is a schematic diagram of a circuit breaker incorporating the invention.

Referring to the schematic diagram of FIG. 1, the circuit breaker 1 includes a casing 3 in which is mounted a pair of separable contacts 5. The separable contacts 5 are opened and closed by a spring powered operating mechanism 7. The contacts can be manually opened and closed by a handle 9 on the operating mechanism. The spring powered operating mechanism 7 is well known in the art and typically includes a latch 11 which, when actuated, automatically opens the separable contacts 5.

The latch 11 is actuated by a trip assembly 13 which responds to selected overcurrent conditions such as a persistent overcurrent condition or a short circuit condition. The trip assembly 13 includes a trip bar 15 that is mounted for rotation about a longitudinal axis 17. The trip bar is typically molded of an insulative resin and has a latch arm 19 projecting laterally. A metal latch plate supported by the latch arm engages the latch 11 and prevents it from being unlatched by movement in the direction of the arrow 23.

The trip assembly 13 also includes a trip unit 25. The exemplary trip unit 25 utilizes a bimetal 27 which is fixed at one end to a load conductor 29. The free end of the bimetal 27 is connected by a flexible shunt 31 to the separable contacts 5 to form the main current path through the circuit breaker 1 which extends from a line conductor 33, through the separable contacts 5, the flexible shunt 31, the bimetal 27 and the load conductor 29. A persistent overcurrent heats the bimetal 27 causing it to bend counterclockwise as viewed in FIG. 1 and shown by the arrow 35. Thus, the bimetal 27 engages a trip arm 37 on the trip bar 15 and rotates the trip bar clockwise as shown by the arrow 39. The clockwise rotation of the trip bar 15 causes the latch plate 21 to disengage from the latch 11 to unlatch the operating mechanism and therefore trip the separable contacts 5 open.

Figure 2:
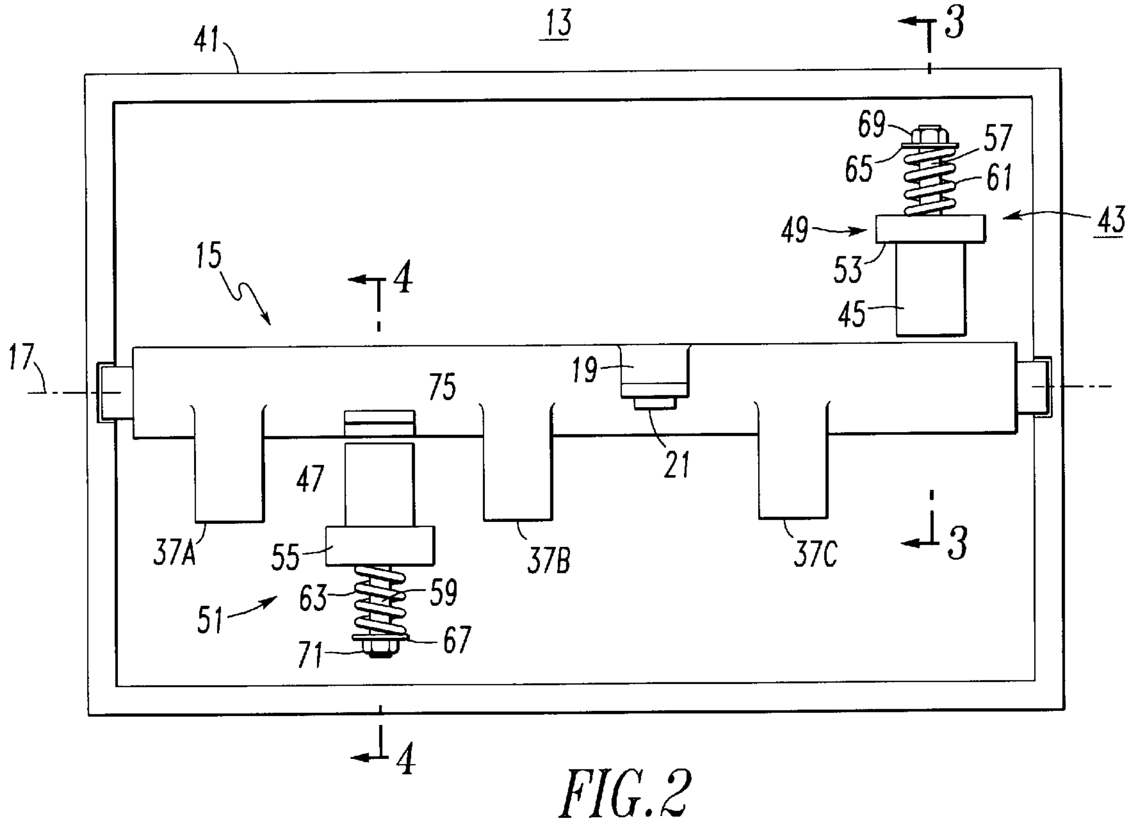
FIG. 2 is a simplified elevation view of a trip unit of the circuit breaker of FIG. 1 illustrating the invention.

FIG. 2 shows the trip bar 15 as an elongated member rotatably mounted at its ends and in a molded trip assembly housing 41. The exemplary trip assembly 13 is for a three-pole circuit breaker, and therefore, the trip bar 15 has three trip arms, 37A, 37B and 37C, one for each pole. Corresponding bimetals (not shown) would be provided for each pole. The trip unit 25 can also include magnetic trip devices (not shown) which respond to very high instantaneous overcurrents, such as would be caused by a short circuit, as is well known. In addition, an electronic trip unit can be provided, for instance, to provide ground fault or arc fault protection. In such case, a solenoid (not shown) would engage an arm (not shown) on the trip bar to also rotate the trip bar to unlatch the latch of the operating mechanism, as is well known. Alternatively, the trip unit could be an all-electronic trip unit in which a solenoid engages a paddle on the trip bar to release the latch.

Regardless of the particular type of trip unit, shock loading, particularly in the vertical direction, can unintendedly release the latch 11. In order to prevent this "shockout" of the circuit breaker, an inertia device 43 is provided. The inertia device 43 includes a pair of masses 45 and 47, each supported by a compliant mount 49 and 51, respectively. Each compliant mount 49 and 51 is a spring mount that includes a mount support 53, 55, which can be integrally molded into the trip assembly housing 41, and a mounting rod 57, 59 carrying the respective masses 45 and 47 and slideable relative to the mount supports 53, 55. The compliant mounts further include helical compression springs 61, 63, concentrically mounted on the mounting rods 55, 57. The springs 61,63 are retained on the mounting rods 57, 59 by washers 65, 67 and retaining nuts 69, 71 threaded onto the ends of the mounting rods so that the springs 61, 63 bear against the washers 65, 67 and the mount supports 53, 55.

The masses 45, 47 are supported by the mount supports 53, 55 so that they are adjacent lateral projections 73 and 75 on the trip bar 15. With the trip unit housing 41 oriented vertically as shown in FIG. 2, the mass 45 is supported above the projection 73 by the spring 61 while the mass 47 rests on the mount support 55.

Figure 3:
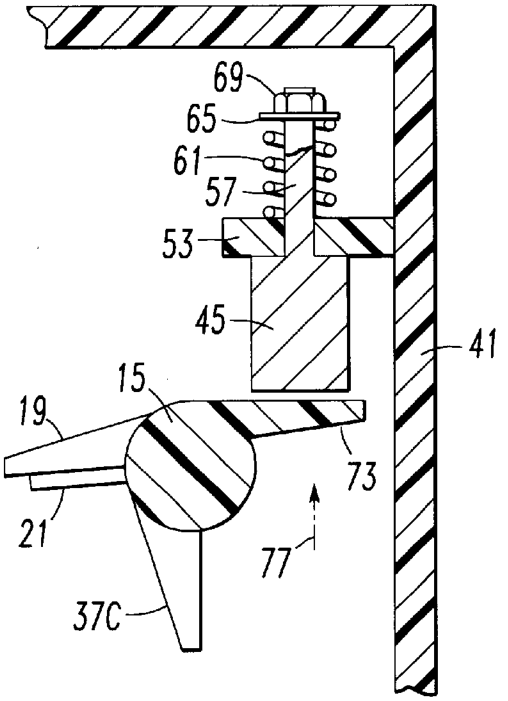
FIG. 3 is a sectional view taken along the line 3—3 in FIG. 2.

If the trip assembly housing 41 is subjected to a shock force in the upward direction as indicated by the arrow 77 in FIG. 3, the impulse lifts the housing, and with it the trip bar 15 in the same upward direction. However, the mass 45 having more inertia remains substantially relatively fixed in space relative to the remainder of the trip assembly so that the lateral projection 73 is restrained by the mass 45 and does not unlatch the latch to trip the circuit breaker. As the mount support 53 is carried by the housing 41 in the upward direction slightly, the spring 61 compresses proportionally and then relaxes as the housing recovers from the shock.

Figure 4:
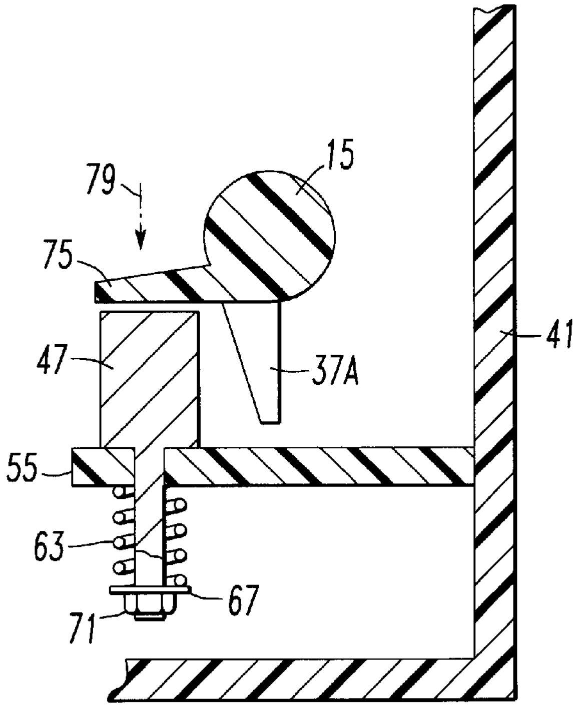
FIG. 4 is a sectional view taken along the line 4—4 in FIG. 2.

On the other hand, if the shock generates an impulse force 79 in the downward direction as shown in FIG. 4 by the arrow 79, the mass 47 resists the impulse and remains fixed to block movement of the projection 75, and therefore prevent unlatching of the trip latch. Again, the mount support 55 moves downward with the casing 41 resulting in compression of the spring 63.

Under normal operating conditions when the trip bar is actuated and rotated in a direction of the arrow 81, the projections 73 and 75 rotate away from the masses 45 and 47, and therefore, the latter do not interfere with normal operation of the trip unit.

The masses 45 and 47 are selected to balance the mass of the trip bar, and thus, can be of unequal size depending upon the configuration of the trip bar.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit breaker comprising:

a casing;

separable contacts;

an operating mechanism incorporating a latch, the operating mechanism opening the separable contacts when the latch is unlatched;

a trip assembly comprising:

a trip bar unlatching the latch when moved to a trip position;

a trip unit moving the trip bar to the trip position in response to selected conditions of current flowing through the separable contacts;

an inertia device preventing movement of the trip bar to the trip position in response to a mechanical shock;

wherein the trip bar comprises an elongated member mounted for rotation about a longitudinal axis, and the inertia device comprises at least one mass, and a compliant mount mounting the at least one mass adjacent the elongated member to engage the elongated member in response to mechanical shock and prevent unlatching of the latch;

wherein the compliant mount comprises a spring mount;

wherein the spring mount comprises a mount support, a mounting rod carrying the at least one mass and slideable relative to the mount support, and a spring coupling the at least one mass to the mount support; and wherein the spring comprises a helical compression spring mounted coaxially with the mounting rod.

2. A circuit breaker comprising:

a casing;

separable contacts;

an operating mechanism incorporating a latch, the operating mechanism opening the separable contacts when the latch is unlatched;

a trip assembly comprising:

a trip bar unlatching the latch when moved to a trip position;

a trip unit moving the trip bar to the trip position in response to selected conditions of current flowing through the separable contacts;

an inertia device preventing movement of the trip bar to the trip position in response to a mechanical shock;

wherein the trip bar comprises an elongated member mounted for rotation about a longitudinal axis, and the inertia device comprises at least one mass, and a compliant mount mounting the at least one mass adjacent the elongated member to engage the elongated member in response to mechanical shock and prevent unlatching of the latch;

wherein the compliant mount comprises a spring mount;

wherein the spring mount comprises a mount support, a mounting rod carrying the at least one mass and slideable relative to the mount support, and a spring coupling the at least one mass to the mount support; and wherein the trip assembly includes a housing in which the elongated member is rotatable mounted and to which the mount support is mounted.

3. A circuit breaker comprising:

a casing;

separable contacts;

an operating mechanism incorporating a latch, the operating mechanism opening the separable contacts when the latch is unlatched;

a trip assembly comprising:

a trip bar unlatching the latch when moved to a trip position;

a trip unit moving the trip bar to the trip position in response to selected conditions of current flowing through the separable contacts;

an inertia device preventing movement of the trip bar to the trip position in response to a mechanical shock;

wherein the trip bar comprises an elongated member mounted for rotation about a longitudinal axis, and the inertia device comprises at least one mass, and a compliant mount mounting the at least one mass adjacent the elongated member to engage the elongated member in response to mechanical shock and prevent unlatching of the latch; and wherein the at least one mass comprises a pair of masses and the compliant mount comprises a pair of compliant mounts mounting the pair of masses on opposite sides of the elongated member to counteract shock loading in opposite directions.

4. The circuit breaker of claim 3 wherein the compliant mounts comprise spring mounts.

5. The circuit breaker of claim 4 wherein each spring mount comprises a mount support, a mounting rod carrying one mass of the pair of masses and slideable relative to the mount support, and a spring coupling the mass to the mounting support.

6. The circuit breaker of claim 5 wherein the spring of each spring mount comprises a helical compression spring mounted coaxially with the mounting rod.

* * * * *